Patented July 18, 1939

2,166,600

UNITED STATES PATENT OFFICE 2,166,600

OXYGEN CONTAINING NITRILES OF THE C5-SERIES AND A PROCESS OF PREPARING THEM

Ernst Otto Leupold, Hofheim in Taunus, and Heinrich Vollmann, Frankfort-on-the-Main-Hochst, Germany, assignors to I. G. Farbenindustrie Aktiengesellschaft, Frankfort-on-the-Main, Germany No Drawing. Application September 21, 1936, Serial No. 101,888. In Germany September 28, 1935

4 Claims. (Cl. 260—464)

The present invention relates to oxygen containing nitriles of the C5-series and a process of preparing them.

We have found that oxygen containing nitriles of the C5-series can be obtained by adding hydrogen cyanide to vinyl methyl ketone. According to the conditions of working it is possible to conduct the addition with formation of the nitrile of the α-vinyl lactic acid or with formation of the nitrile of the levulinic acid. If the addition is conducted at temperatures from about 15° C. to about 80° C. in the presence of small quantities of alkaline reacting agents with or without an indifferent diluent, the addition of the hydrogen cyanide takes place exclusively at the olefin linkage and there is obtained the nitrile of the levulinic acid (Formula II) in a yield of more than 90 per cent. of the theoretical yield.

If, however, the addition of hydrogen cyanide to vinyl methyl ketone is carried out at temperatures from about 15° C. to about —20° C. in the presence of indifferent diluents, such as benzene or ether, it is possible to isolate the unsaturated hydroxy nitrile of the Formula I without a simultaneous formation of essential quantities of the ketonitrile of the Formula II. The transformation is probably prevented by working at a relatively low temperature and by the destruction of the alkaline condensing agent by acidification while the reaction mixture is still cold. It cannot be ascertained whether the hydroxy nitrile I is transformed into the keto nitrile II in the presence of alkaline agents at an ordinary or elevated temperature, but it is supposed to be possible.

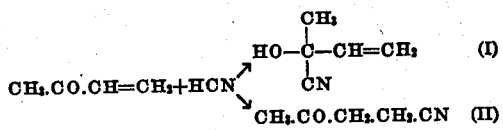

The addition of hydrocyanic acid to keto groups or to olefin linkages is known; in the present case however not only is it surprising that the hydrogen cyanide can be added in any desired direction but also—in view of the high tendency of the vinyl methyl ketone to polymerize in the presence of alkalies—that these additions proceed successfully without the simultaneous formation of polymerization products.

As alkaline reacting substances there may be used for instance potassium hydroxide, sodium hydroxide, potassium cyanide, sodium cyanide, potassium carbonate, sodium carbonate, pyridine and many others. As diluents there may be used for instance hydrocarbons such as benzene, toluene, pentane, hexane, cyclohexane, furthermore ethers and chlorinated hydrocarbons such as methylene chloride or trichlorethylene.

The two nitriles obtainable by the present process and described in detail in the following examples have hitherto been unknown. They may be used as intermediate products especially for the preparation of solvents and softening agents, artificial materials and adjuvants for the textile industry, the nitrile of the levulinic acid likewise for the preparation of dyestuffs.

The following examples serve to illustrate the invention but they are not intended to limit it thereto, the parts being by weight:

(1) About 2 parts of potassium cyanide are introduced into a mixture of 140 parts of vinyl methyl ketone and 300 parts of benzene. While 70 parts of anhydrous hydrocyanic acid are gradually run into the mixture the temperature is maintained between 5° C. and 15° C. After the mixture has been stirred at this temperature for half an hour, it is acidified by the addition of phosphoric acid of the highest percentage strength. The reaction mixture is then decanted from the phosphoric acid and dried with anhydrous sodium sulfate. The benzene, the vinyl methyl ketone which has not reacted and the hydrocyanic acid are then expelled under a reduced pressure of 30 mm. to 40 mm. at a water bath temperature of 50° C. to 60° C. By the high vacuum distillation under a pressure of 0.05 mm. to 0.1 mm. there is obtained, after a small quantity of first runnings, in a yield of about 90 parts (that is 40 to 50 per cent. of the theoretical yield) a product which boils at a temperature of 49° C. to 51° C., is clear as water and has an almond-like, penetrating odor. As distillation residue which can no longer be distilled even in the high vacuum there remains only a very small quantity of a light brown, viscous liquid. Under these conditions no addition of the hydrocyanic acid to the olefinic double linkage occurs.

Under a pressure of 1 atmosphere the boiling point of the cyanohydrin thus formed is about 140° C.

$$n_D^{17.5} = 1.4264$$

The results of the analysis and the chemical behaviour prove the presence of the nitrile of the α-vinyl lactic acid. The presence of a free hydroxyl group may be proved by the reaction with acetic anhydride.

The addition of hydrocyanic acid to the vinyl methyl ketone may likewise be performed in other indifferent solvents, such as ether, methylene chloride or the like and with the use of other agents which accelerate the reaction, such as potassium carbonate, pyridine or the like; it is only necessary to take care to maintain a low reaction temperature.

(2) 350 parts of vinyl methyl ketone are stirred at ordinary temperature together with 190 parts of nearly anhydrous hydrocyanic acid; during this operation there is no essential heat evolution.

0.3 part of anhydrous potassium carbonate are then added to the mixture which has been introduced into a vessel provided with an efficient reflux condenser cooled to a low temperature. The reaction which immediately occurs with evolution of heat is at first slightly moderated by external cooling; the temperature of the mixture is then caused to rise gradually in the course of 40 minutes of about 80° C.; during this operation the reflux of the hydrogen cyanide becomes less and less. After the mixture has been stirred for further 2 hours at 80° C. it is feebly acidified with a few drops of sulfuric acid and then distilled under reduced pressure. After collection of the first runnings—substantially the hydrogen cyanide used in excess—nearly the whole quantity distils constantly under a pressure of 7 mm. and at a constant temperature of 104° C. The residue consists only of about 30 parts of brown resin.

The reaction product so obtained in a yield of about 450 parts (more than 90 per cent. of the theoretical yield) is a colorless liquid of feeble caraway-like odor. The boiling point under a pressure of 1 mm. is 90° C. and under atmospheric pressure is 235° C.

$$n_D^{17.5} = 1.4294$$

The chemical behaviour, the determination of the molecular weight and the results of the analysis show it to be the nitrile of the levulinic acid hitherto not yet described in the relevant literature. Thus the product reacts with the usual reagents for ketone (semicarbazone colorless needles from methyl alcohol, melting point 174° C., para-nitrophenylhydrazone yellow needles from chlorobenzene, melting point 178° C. to 179° C.) and can readily be transformed into the known ethyl ester of the levulinic acid (boiling point under 754 mm. pressure=204° C.) by boiling it with alcoholic hydrochloric acid. The free levulinic acid may also be obtained in a good yield from the nitrile according to the usual saponification methods.

The addition of the hydrogen cyanide to the vinyl methyl ketone with formation of the levunitrile may also be conducted by introducing first the hydrogen cyanide and the potassium carbonate or cyanide and then adding the vinyl methyl ketone proportionally to the loss of heat. The addition of indifferent solvents leads to the same results when the operation is conducted with application of heat.

We claim:

1. The process which comprises causing hydrocyanic acid to act upon vinyl methyl ketone at a temperature between about −20° C. and 15° C. in the presence of an agent of alkaline reaction.

2. The process which comprises causing hydrocyanic acid to act upon vinyl methyl ketone at a temperature between about −20° C. and 15° C. in the presence of an agent of alkaline reaction and of an indifferent diluent.

3. The process which comprises causing hydrocyanic acid to act upon vinyl methyl ketone at a temperature between about 5° C. and 15° C. in the presence of benzene and potassium cyanide.

4. The nitrile of the α-vinyl lactic acid, said product having the formula

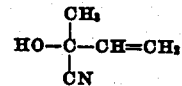

and being a clear colorless liquid, boiling at about 140° C.

ERNST OTTO LEUPOLD.
HEINRICH VOLLMANN.